(12) United States Patent
Li et al.

(10) Patent No.: US 9,889,396 B2
(45) Date of Patent: *Feb. 13, 2018

(54) GEOSYNTHETIC COMPOSITE FOR FILTRATION AND DRAINAGE OF FINE-GRAINED GEOMATERIALS

(71) Applicant: GSE Environmental, LLC, Houston, TX (US)

(72) Inventors: Mengjia Li, Houston, TX (US); Darrell L. Heathcott, Kingstree, SC (US)

(73) Assignee: GSE Environmental, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,051

(22) Filed: Jan. 16, 2017

(65) Prior Publication Data

US 2017/0120175 A1 May 4, 2017

Related U.S. Application Data

(63) Continuation of application No. 13/788,258, filed on Mar. 7, 2013, now Pat. No. 9,566,775.

(51) Int. Cl.
*B32B 7/08* (2006.01)
*B01D 39/16* (2006.01)
(Continued)

(52) U.S. Cl.
CPC ....... *B01D 39/1623* (2013.01); *B01D 39/083* (2013.01); *B09B 1/00* (2013.01); *B09B 1/008* (2013.01); *B32B 5/022* (2013.01); *B32B 5/024* (2013.01); *B32B 5/028* (2013.01); *B32B 5/06* (2013.01); *B32B 5/26* (2013.01); *B32B 37/0084* (2013.01); *B32B 37/144* (2013.01); *B32B 37/16* (2013.01); *B32B 38/04* (2013.01);
(Continued)

(58) Field of Classification Search
CPC ..................................... B32B 7/00; B32B 7/08
USPC .......................... 442/235, 245, 247, 268-271
See application file for complete search history.

(56) References Cited

U.S. PATENT DOCUMENTS

| 5,401,552 A | 3/1995 | Bohrer et al. |
| 5,795,835 A | 8/1998 | Bruner et al. |

(Continued)

FOREIGN PATENT DOCUMENTS

| EP | 1785262 A1 | 5/2007 |
| GB | 2286004 A | 8/1995 |
| GB | 2356880 A | 6/2001 |
| KR | 1020090023769 | 3/2009 |

OTHER PUBLICATIONS

International Search Report and Written Opinion dated May 14, 2014.
(Continued)

*Primary Examiner* — Sunil Singh
(74) *Attorney, Agent, or Firm* — Wood, Phillips, Katz, Clark & Mortimer

(57) ABSTRACT

A geocomposite with a geonet and a geotextile. The geotextile has a nonwoven fabric layer and a woven fabric layer, with the nonwoven fabric connected by needle-punching to the woven fabric whereby fibers of the nonwoven fabric extend through and beyond the woven fabric, and the woven fabric and fibers of the nonwoven fabric extending through the woven fabric are bonded to one side of the geonet.

14 Claims, 3 Drawing Sheets

(51) Int. Cl.
| | |
|---|---|
| *B01D 39/08* | (2006.01) |
| *B32B 5/26* | (2006.01) |
| *B32B 5/02* | (2006.01) |
| *B32B 5/06* | (2006.01) |
| *B09B 1/00* | (2006.01) |
| *B32B 37/00* | (2006.01) |
| *B32B 37/14* | (2006.01) |
| *B32B 37/16* | (2006.01) |
| *B32B 38/04* | (2006.01) |

(52) U.S. Cl.
CPC .............. *B01D 2239/0208* (2013.01); *B01D 2239/0216* (2013.01); *B01D 2239/0659* (2013.01); *B32B 7/08* (2013.01); *B32B 2038/042* (2013.01); *B32B 2262/0253* (2013.01); *B32B 2262/0276* (2013.01); *B32B 2305/188* (2013.01); *B32B 2305/20* (2013.01); *B32B 2307/726* (2013.01)

(56) References Cited

U.S. PATENT DOCUMENTS

| | | |
|---|---|---|
| 6,802,672 B2 | 10/2004 | Hardin et al. |
| 7,470,094 B2 | 12/2008 | Heathcott et al. |
| 2003/0022567 A1 | 1/2003 | Kim et al. |
| 2004/0151548 A1* | 8/2004 | Hardin ............... B09B 1/00 405/129.1 |
| 2006/0029473 A1 | 2/2006 | Khire |
| 2007/0104543 A1* | 5/2007 | Heathcott ............ B29D 28/00 405/302.7 |
| 2008/0069642 A1 | 3/2008 | Ayers et al. |
| 2008/0080936 A1* | 4/2008 | Quinley ................ E02B 3/127 405/302.7 |
| 2009/0041544 A1* | 2/2009 | Ramsey ................ B09B 1/00 405/129.95 |

OTHER PUBLICATIONS

Supplementary European Search Report and Search Opinion dated Oct. 26, 2016.

\* cited by examiner

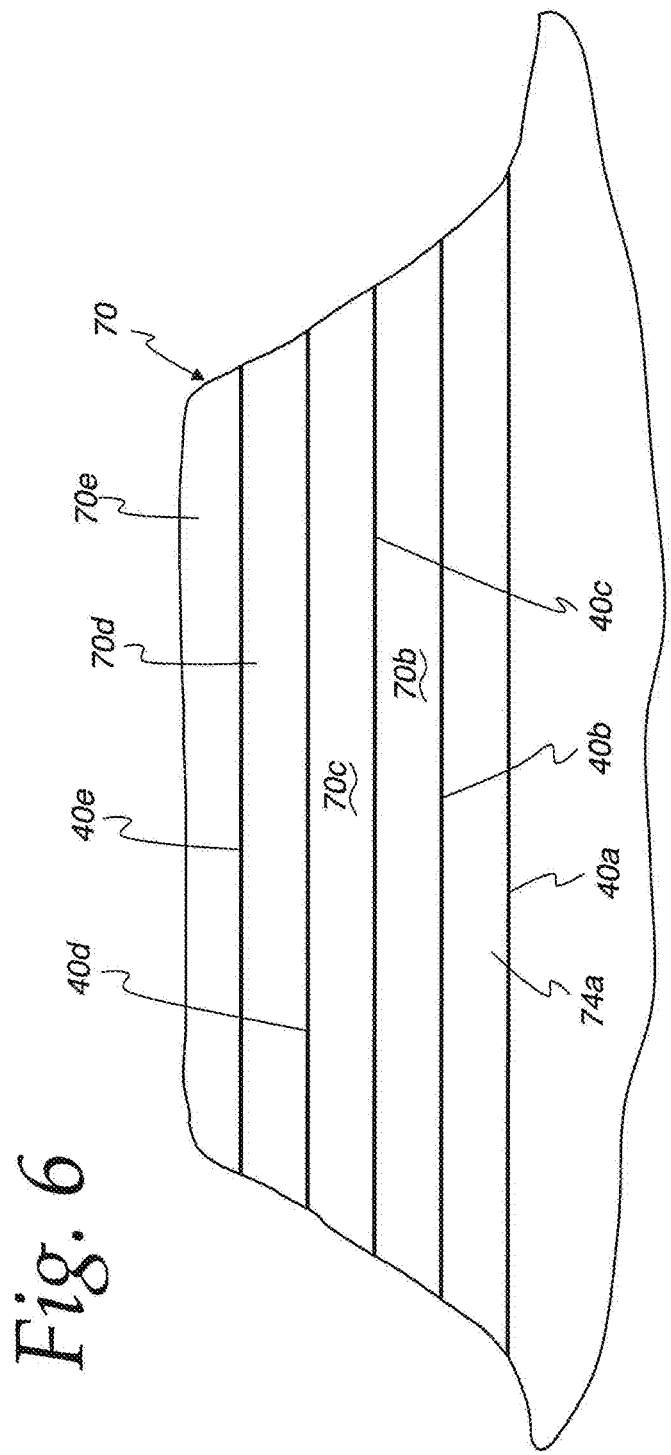

US 9,889,396 B2

GEOSYNTHETIC COMPOSITE FOR FILTRATION AND DRAINAGE OF FINE-GRAINED GEOMATERIALS

CROSS-REFERENCE TO RELATED APPLICATIONS

This application claims priority to U.S. Ser. No. 13/788,258, filed Mar. 7, 2013, which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention is directed toward geocomposites, and more particularly toward geocomposites usable in environments in which high content of fine-grained geomaterials is present

BACKGROUND OF THE INVENTION

Effective filtration and drainage systems has proven to be critical in geotechnical and geoenvironmental engineering of fine-grained geomaterials, such as silts or clays, coal combustion products (CCPs) including fly ash and flue gas desulfurization (FGD) materials, and river or sea dredged sediments, etc. For instance, coal combustion products (CCPs) are regularly deposited in landfills which require a leachate collection system beneath the CCPs waste to provide sufficient drainage and reduce the hydraulic head on top of water-barrier liners.

Leachate collection systems have generally consisted of a drainage layer with in-plane lateral flow capacity, and filter layer(s) which retain solid particles in order to maintain soil structural stability while also allowing liquids to pass. Geosynthetic drainage composites, consisting of a drainage geonet core with heat-bonded nonwoven geotextile filter(s), have been widely used for this purpose in many geotechnical drainage applications including municipal solid waste (MSW) landfill leachate collection.

The fabrics used in geotextile filters must therefore have sufficiently large openings to allow the requisite flow of liquid therethrough while at the same time having openings which are sufficiently small to block the solid particles from passing therethrough. Meeting such conflicting requirements can be, and has been, difficult for systems in which a very high content of fine-grained geomaterials is present. Moreover, such fabrics can encounter serious filtration problems such as fines' migration (called "piping") or filter clogging.

Nonwoven fabrics have commonly been used as geotextile filters. However, tensile strains on such nonwoven fabrics can change the pore opening sizes over the life of the product. Moreover, manufacture of nonwoven fabrics will occasionally result in a fabric which has small light spots with larger openings than other areas of the fabric, and such spots will control the ultimate filtration performance of the material. Woven fabrics have also been used as geotextile filters. However, woven filters typically have only a limited number of the openings per unit area, and fines particles can accumulate at any individual opening and block the water flow (called "surface blinding"). In short, such geotextile filters can encounter difficulty over their useful life, particularly in environments where high contents of fine-grained geomaterials are present.

As a result, it has been common in CCPs landfills to utilize a leachate collection system made of the costly and space-consuming granular materials (e.g., several feet of a fine sand filtration layer plus an aggregate or well-graded bottom ash drainage layer).

The present invention is directed toward providing efficient and inexpensive filtration and drainage even in environments in which high contents of fine-grained geomaterials such as coal combustion product (CCPs) are present.

SUMMARY OF THE INVENTION

In one aspect of the present invention, a geotextile filter is provided for use with a geonet in a geotechnical construction site, including a primary layer consisting of a nonwoven fabric having an apparent opening size (AOS) at least about 0.180 mm and a thickness greater than about 1.0 mm at 2 kPa normal load, and a secondary layer consisting of a woven fabric having about 2% to 20% open area and an AOS between about 0.074 mm and 0.841 mm. The woven fabric is adapted for connecting on one face to a geonet, and the nonwoven fabric is connected to the opposite face of the woven fabric by needle punching whereby fibers of the nonwoven fabric are punched through the woven fabric to extend beyond the woven fabric one face.

In one form of this aspect of the invention, the woven fabric consists of woven high-modulus polymeric filaments. In one further form, the filaments are monofilaments, and in another further form, the filaments are multifilament.

In another form of this aspect of the invention, the nonwoven fabric has a cross-plane water flow rate of greater than 3,000 liter/min/m$^2$.

In still another form of this aspect of the invention, the woven fabric has a cross-plane water flow rate between about 500 and 8,000 liter/min/m$^2$.

In yet another form of this aspect of the invention, the nonwoven fabric and woven fabric when connected have a combined permeability greater than 0.1 cm/sec.

In another aspect of the present invention, a geocomposite is provided for use in a geotechnical construction site, including a geonet and a geotextile. The geotextile has a primary layer consisting of a nonwoven fabric having upper and lower faces, and a secondary layer consisting of a woven fabric having upper and lower faces. The nonwoven fabric lower face is connected by needle-punching to the woven fabric upper face whereby fibers of the nonwoven fabric extend through the woven fabric and beyond the woven fabric lower face, and the woven fabric lower face and fibers of the nonwoven fabric extending through the woven fabric lower face are bonded to one side of the geonet.

In one form of this aspect of the invention, the woven fabric comprises woven high-modulus polymeric filaments.

In another form of this aspect of the invention, the geonet includes a first and second plurality of substantially incompressible parallel strands, the first plurality of strands being disposed on top of the second plurality of strands and at an angle relative to the second plurality of strands whereby the first and second plurality of strands are secured to one another by connected areas at crossover locations, and the woven fabric lower face and fibers of the nonwoven fabric extending through the woven fabric lower face are heat bonded to the first plurality of strands.

In still another form of this aspect of the invention, the geonet strands are high density polyethylene (HDPE).

In yet another form of this aspect of the invention, a second non-woven fabric is bonded to the other side of the geonet.

In another form of this aspect of the invention, the nonwoven fabric has a cross-plane water flow rate of greater than 3,000 liter/min/m².

In still another form of this aspect of the invention, the woven fabric has a cross-plane water flow rate between about 500 and 8,000 liter/min/m².

In yet another form of this aspect of the invention, the nonwoven fabric and woven fabric when connected have a combined permeability greater than 0.1 cm/sec.

In still another aspect of the present invention, a landfill includes alternating layers of fill and geocomposites, the geocomposites each disposed adjacent to an overlying layer of fill to facilitate draining of liquid from the landfill. The geocomposites each include a geotextile bonded to the upper side of a geonet having a plurality of connected substantially longitudinal strands. The geotextile has a nonwoven fabric and a woven fabric, wherein the nonwoven fabric lower face is connected by needle-punching to the woven fabric upper face whereby fibers of the nonwoven fabric extend through the woven fabric and beyond the woven fabric lower face, and the woven fabric lower face and fibers of the nonwoven fabric extending through the woven fabric lower face are bonded to the geonet upper side whereby the nonwoven fabric upper side is adjacent to the overlying layer of fill.

In one form of this aspect of the invention, the geonet strands include a first and second plurality of substantially incompressible parallel strands, with the first plurality of strands being disposed on top of the second plurality of strands and at an angle relative to the second plurality of strands with the first and second plurality of strands secured to one another by connected areas at crossover locations. Also in this form of this aspect of the invention, the woven fabric lower face and fibers of the nonwoven fabric extending through the woven fabric lower face are heat bonded to the first plurality of strands.

In another form of this aspect of the invention, the nonwoven fabric and woven fabric when connected have a combined permeability of at least about 0.1 cm/sec and the landfill permeability is no more than one tenth (1/10) of the combined permeability of the connected fabrics. In a further form, the nonwoven fabric and woven fabric when connected have an apparent opening size (AOS) less than about 0.106 mm.

In still another form of this aspect of the invention, the nonwoven fabric has a cross-plane water flow rate of greater than 3,000 liter/min/m².

In yet another form of this aspect of the invention, the woven fabric has a cross-plane water flow rate between about 500 and 8,000 liter/min/m².

In another form of this aspect of the invention, the nonwoven fabric and woven fabric when connected have a combined permeability greater than 0.1 cm/sec.

In yet another aspect of the present invention, a method of making a geocomposite is provided, including the steps of (1) providing a woven fabric, (2) producing a nonwoven fabric by needle punching fibers wherein the woven fabric is located adjacent the nonwoven fabric being produced whereby the needle punching pushes fibers of the nonwoven fabric through the woven fabric to connect the woven and nonwoven fabrics, (3) providing a geonet, and (4) heat bonding the geonet to the connected woven and nonwoven fabrics, wherein the geonet is bonded to the woven fabric and the nonwoven fabric fibers pushed through the woven fabric.

In one form of this aspect of the invention, the provided woven fabric has about 2% to 20% open area and an apparent opening size (AOS) between about 0.074 mm and 0.841 mm, and the producing step produces a nonwoven fabric having an apparent opening size (AOS) at least about 0.180 mm and a thickness greater than about 1.0 mm at 2 kPa normal load.

Other objects, features, and advantages of the invention will become apparent from a review of the entire specification, including the appended claims and drawings.

BRIEF DESCRIPTION OF THE DRAWINGS

FIG. 6 is a side cross-sectional view of a landfill having a plurality of layers separated by a plurality of geocomposites according to the present invention.

DETAILED DESCRIPTION OF THE PREFERRED EMBODIMENT

Figure 1:
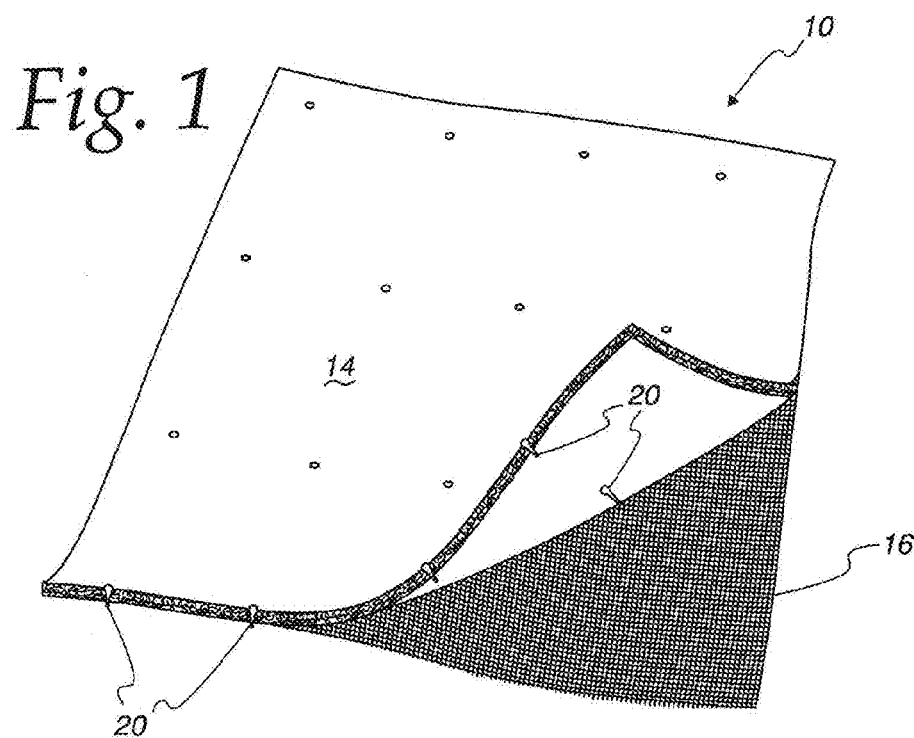
FIG. 1 is a perspective illustration of a geotextile composite filter according to the present invention, with the top nonwoven fabric layer separated at a corner from the woven fabric layer to further illustrate a few fibers of the nonwoven fabric which are needle punched through the woven fabric.
Figure 2:
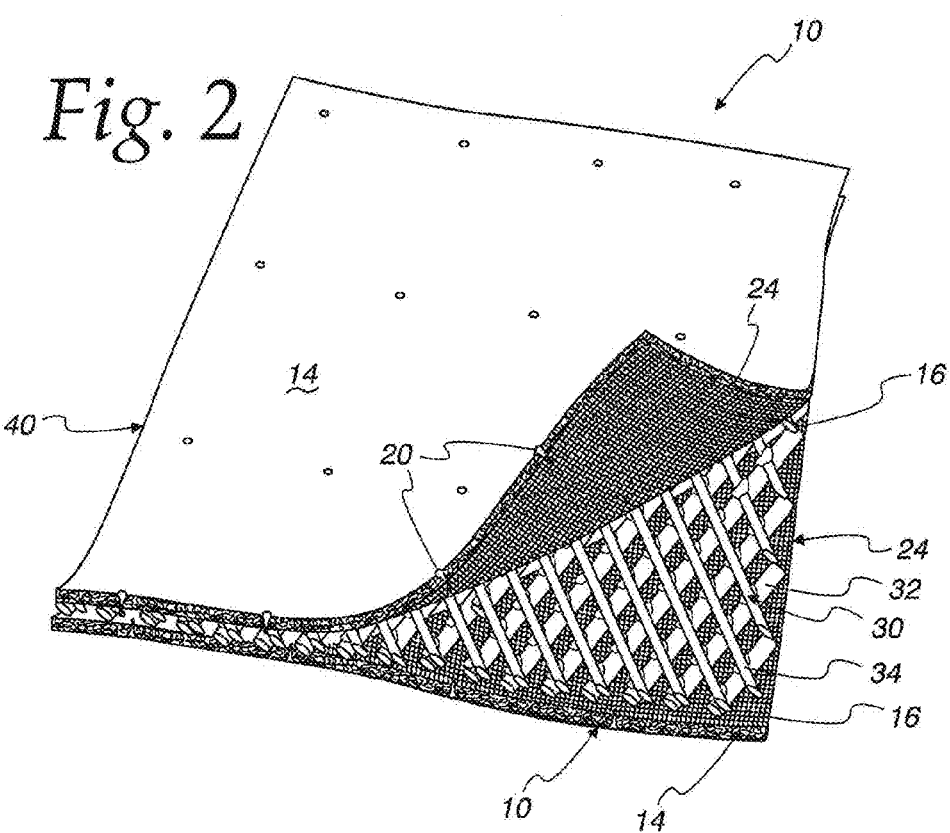
FIG. 2 is a perspective view of a geocomposite having geotextile composite filters according to FIG. 1 secured to the top and bottom of a geonet, with the top geotextile composite filter separated from the geonet at a corner to illustrate the various layers.

FIG. 1 illustrates a two-layer geotextile filter 10 having a primary filter layer 14 consisting of a nonwoven fabric and a secondary filter layer 16 consisting of a woven fabric. As described in further detail below, the two layers 14, 16 are needle-punched together to make an integral two-layer geotextile filter 10 wherein fibers 20 of the nonwoven fabric layer 14 project through the woven fabric layer 16 so as to form a fuzzy surface 24 on the side of the woven fabric layer 16 opposite of the nonwoven fabric layer 14 (as illustrated in FIGS. 1 and 2, only a few such fibers 20 are highlighted for clarity of the drawing).

The nonwoven primary filter layer 14 may be advantageously manufactured from needle-punching staple fibers, with the denier of the fibers and size of the needle selected to provide an opening size distribution that is needed for the target application. Thus, in accordance with the present invention, the primary filter layer 14 may advantageously have an apparent opening size (AOS) equal or greater than US sieve #80 (0.180 mm), a cross-plane water flow rate of greater than 3,000 liter/min/m², and additionally the nonwoven primary filter layer 14 may have a minimum thickness of greater than 1.0 mm at 2 kPa normal load. For example, this primary filter layer 14 may advantageously be a nonwoven needle-punched geotextile having 6 or 8 oz./yd$^2$ mass per unit area, such geotextiles being available from GSE Lining Technologies under the product trade names NM6 and NW8, respectively.

The secondary filter layer 16, consisting of a woven fabric, is dimensionally stable and highly permeable. Thus, the woven fabric of the secondary filter layer 16 may be advantageously formed of woven filaments which are, for example, high-modulus polymeric (e.g., polypropylene or polyester) monofilament or multifilament yarns or slit film, with an advantageous mass per unit area of the woven geotextile of around 5.8 oz./yd$^2$. Depending on the properties of the geomaterials expected in the environment where the filter 10 is to be installed, the woven secondary filter layer 16 may advantageously have a percent open area (POA) from 2% to 20%, an apparent opening size (AOS) from US Sieve #20 to #200 (0.074 mm and 0.841 mm), and a cross-plane water flow rate from 500 to 8,000 liter/min/m$^2$. The grab tensile strength of the woven fabric of the secondary filter layer 16 may also advantageously be greater than 200 pounds and the grab tensile elongation less than 50%, and should have sufficient hardiness to avoid being damaged by the needle-punching process described in further detail hereafter.

The nonwoven needle-punched layer 14 and a woven layer 16 of the composite geotextile filter 10 are mechanically bonded in a needle-punching process by inserting the woven layer 16 directly into the production process of the nonwoven fabric. The need-punching process pushes nonwoven staple fibers 20 through the woven fabric to create the "fuzzy" or fibrous surface 24 on the woven side of the composite geotextile filter layer 10. The needle-punched fibers 20 extending through the woven fabric of the secondary filter layer 16 function to bind the nonwoven fabric of the primary filter layer 14 to the woven fabric of the secondary filter layer 16. The opening size of the geotextile filter 10 is selected so as to work with needles in the needle-punching process as well as lead to the desired pore size for the finished product.

It should be appreciated that the design requirements for the geotextile properties of the filter layers 14, 16 vary according to the types of the fine-grained geomaterials anticipated in the environment where the geocomposite 40 is to be used. However, generally it is advantageous that the woven and nonwoven fabrics when connected by needle-punching provide an overall permeability greater than 0.1 cm/sec, and at least ten times higher than the adjacent geomaterials' permeability. Further, the two-layer geotextile filter 10 should have a typical apparent opening size (AOS) less than 0.106 mm (US sieve #140) in order to efficiently retain geomaterial particles finer than 0.075 mm.

As illustrated in FIG. 2, an advantageous geosynthetic drainage composite (geocomposite) 40 according to the present invention is made by heat-bonding the finished two-layer geotextile filter of FIG. 1 to a suitable geonet 30 to form a geocomposite 40. Advantageously, the geonet 30 may, for example, have two sets of high density polyethylene (HOPE) strands 32, 34 that are extruded in a continuous process to form and connected at cross-over points, such as the drainage geonet disclosed in U.S. Pat. No. 7,470,094, the disclosure of which is hereby fully incorporated by reference.

It should be appreciated that the fuzzy surface 24 of the geotextile filter 10 also provides surface area to improve the bonding strength of the geotextile filter 10 to the geonet 30 when they are heat-laminated together, such that a ply adhesion of the finished geocomposite may advantageously be greater than 0.5 lbs/inch.

Figure 3:
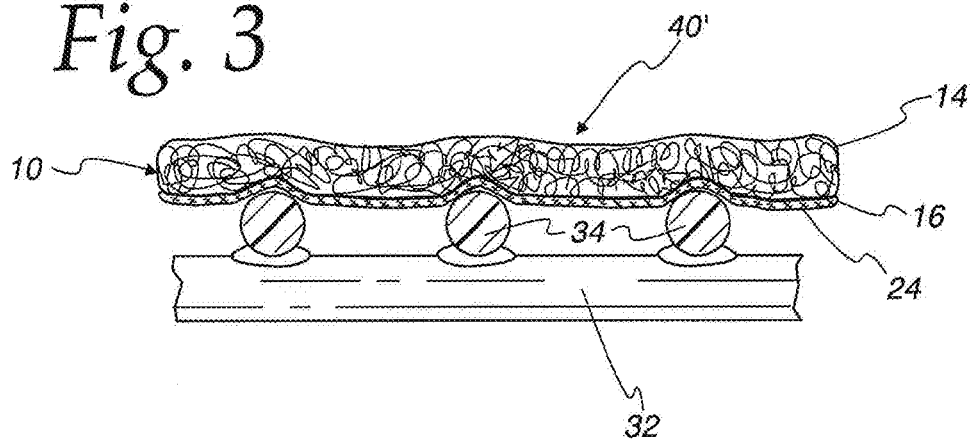
FIG. 3 is a side cross-sectional view of a geocomposite according to one embodiment of the present invention having a geotextile composite filter only on the top side of the geonet.
Figure 4:
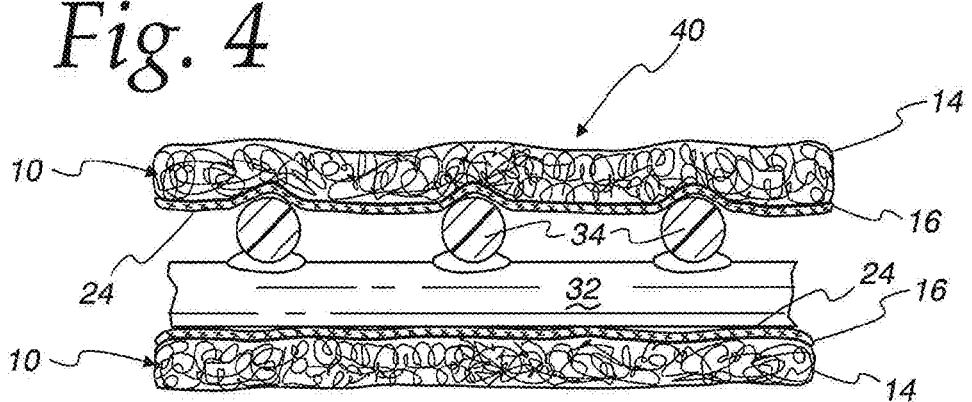
FIG. 4 is a side cross-sectional view of a geocomposite according to the FIG. 2 embodiment of the present invention having a geotextile composite filter heat bonded to both sides of the geonet.
Figure 5:
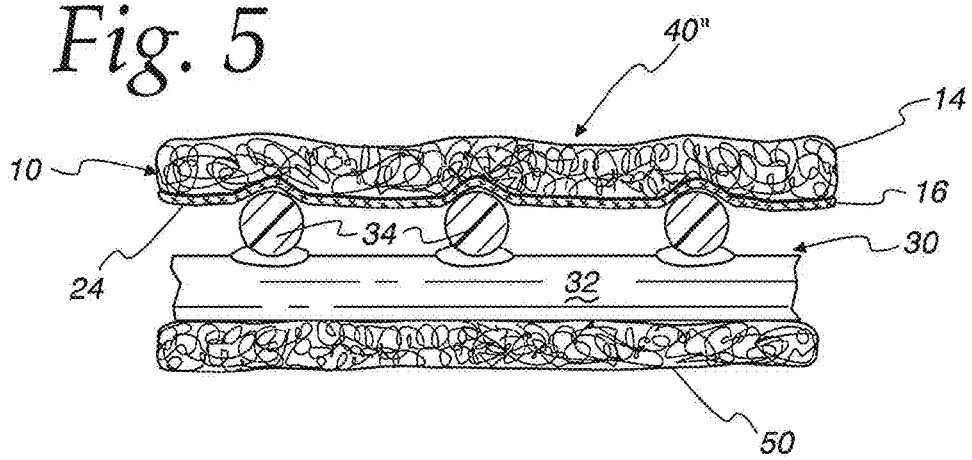
FIG. 5 is a side cross-sectional view of a geocomposite according to still another embodiment of the present invention having a geotextile composite filter secured to the top side of the geonet and a nonwoven fabric secured to the bottom side of the geonet.

FIGS. 3-5 illustrate different geocomposites in which the present invention has been incorporated. It should be appreciated, as illustrated in these Figures, that a geocomposite 40 according to the present invention may have the two-layer geotextile filter 10 bonded (on the fuzzy size 24) to both sides of the geonet 30, or bonded to only one side while having the other side of the geonet left unbounded, or bonded to a regular nonwoven filter.

Specifically, in FIG. 3, a geocomposite 40' is illustrated in which a geotextile filter 10 such as illustrated in FIG. 1 is heat bonded to the top of a suitable geonet 30, with nothing bonded to the other (bottom) side of the geonet 30.

FIG. 4 illustrates the geocomposite 40 of FIG. 2, wherein geotextile filters 10 such as illustrated in FIG. 1 are heat bonded to both sides of the geonet 30, wherein the fuzzy side 24 of both geotextile filters 10 are heat bonded to the geonet 30. The nonwoven filter layer 14 of the composite geotextile filter 10 faces the particulate or liquid substance being filtered, which is typically located above the filter 10. However, this geocomposite 40 having the composite geotextile filter 10 on both the top and bottom can be particularly well suited for environments in which the substance being filtered may not only flow down through the filter 10 from above but may also flow up from below the filter 10.

In FIG. 5, a geocomposite 40" is illustrated wherein the fuzzy side 24 of a geotextile filter 10 such as illustrated in FIG. 1 is heat bonded to the top of the geonet 30, and a suitable nonwoven fabric layer 50 is heat bonded to the bottom of the geonet 30. Bonding of the geotextile filter 10, geonet 30 and nonwoven fabric layer 50 may be suitably achieved by passing the three components through a heated wedge lamination process to form a monolithic drainage geocomposite 40". This embodiment is particularly well suited for use in sloped environments, wherein the nonwoven fabric layer 50 will provide a friction surface which facilitates maintaining the geocomposite 40" in place. In environments in which the slopes are very mild (e.g., 2%), a single-sided drainage geocomposite such as illustrated in FIG. 3 may be used.

FIG. 6 illustrates, in cross-section, a landfill 70 in which geocomposites 40 according to the present invention may be advantageously used. As the landfill is made, a first layer of geocomposites 40a is laid down on the surface of the area on which the landfill 70 is being formed. In accordance with the present invention, the geocomposite 40 is laid so that the nonwoven side of the primary filter layer 14 of the two-layer geotextile filter 10 faces up toward geomaterials to be placed on top of the geocomposite 40. Of course, the area being covered may be extremely large, and therefore more than one section of geocomposite 40a will typically be required to cover the entire area at each layer. Fill 74a will then be placed on top of the geocomposite 40a to a desired depth such as is known in the art, and then a second layer of geocomposites 40b is then laid down on that area. Further layers of fill 70b-70e and geocomposites 40c-40e are similarly added according to the design of the landfill 70. As is known to those skilled in the art, geocomposites 40a-40e such as illustrated may be used to facilitate fluid flow through the landfill 70. Moreover, other structures, such as pumps and vertical and horizontal pipes, may also be used in conjunction with such geocomposites 40a-40e to intentionally circulate leachate through the landfill and thereby facilitate stabilization of the landfill 70 so that it may thereafter be returned to other productive uses more quickly.

Geocomposites 40 having geotextile filters 10 such as described herein may be advantageously used particularly in large landfills where they are subjected to high pressures over long periods of time. In particular, geocomposites 40 having geotextile filters 10 in accordance with the present invention maybe be advantageously used in environments requiring filtration of various types of fine-grained geomaterials, that is, requiring efficient retention of fines particles while also providing a high cross-plane permeability to allow liquids to pass through freely. However, it should further be understood that geocomposites 40 according to the present invention, though advantageously usable in geotechnical construction sites such as landfills 70 as described above, may also be advantageously usable in a wide variety of geotechnical construction sites, including not only common horizontal orientations facilitating drainage over a site but also vertical orientations such as in mechanically stabilized earth walls.

Additionally, whereas traditional nonwoven needle-punched geotextiles have been stretched in order to achieve the desired mechanical properties, little or no stretching is necessary with the nonwoven fabric of the primary filter layer 14 of the present invention as the woven fabric of the secondary filter layer 14 provides the desired mechanical properties of a compact and uniform mat obtained with the desired opening size.

Further, since the woven fabrics have a much broader range of hydraulic, physical, and mechanical properties than that of nonwoven ones, the primary filter layer 14 can provide great design flexibility by allowing creation of a pore structure which achieves satisfactory long-term piping and clogging resistance against a broad variety of fine-grained geomaterials.

Still further, whereas production of nonwoven geotextiles usually produces some small "light spots with largest openings" (which will control the ultimate filtration performance of this material), use of the nonwoven fabric in conjunction with a woven fabric (which can provide more reliably consistent pore structure or opening size distribution) can overcome that drawback. That is, the woven fabric of the secondary filter layer 16 with properly selected POA and AOS function to essentially fix nonwoven "light spots" and thereby prevent large amount of fines from piping through any small areas of the nonwoven fabric having relatively large openings.

Additionally, the high tensile modulus which may be provided by the woven fabric of the secondary filter layer 16 helps maintain a stable structure in the finished two-layer filter 10, as it decreases the strains exerted on the nonwoven fabric of the primary filter layer 14 and, therefore, prevents possible adverse changes in its pore opening size distribution.

Further, the combination of the woven and nonwoven fabrics in the geotextile filter 10 can advantageously avoid the previously mentioned problem of "surface blinding" (resulting from fine particles accumulating at, and blocking, individual ones of the limited openings in the woven fabric), as the random fiber structure of the nonwoven fabric of the primary filter layer 14 creates a relatively thick cushion layer to avoid such woven "surface blinding" issues.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A geotechnical layer for use in a geotechnical project site, comprising:
   (a) a geotextile for cross-plane filtering of fine particles from a fluid comprising:
   a primary layer consisting of a first nonwoven fabric with opposite faces and adapted to initially filter fluid having fine particles, wherein said first nonwoven fabric has an apparent opening size (AOS) at least about 0.180 mm and a thickness greater than about 1.0 mm at 2 kPa normal load, and
   a secondary layer consisting of a first woven fabric with opposite faces and adapted to secondarily filter particles not filtered from the fluid by the first nonwoven fabric of the primary layer,
   wherein one of the opposite faces of said first nonwoven fabric is directly against one of the opposite faces of said first woven fabric, said first nonwoven fabric connected to said first woven fabric by needle punching whereby fibers of said first nonwoven fabric are punched into said first woven fabric to extend through said one opposite face of said first woven fabric, wherein said first woven fabric has about 2% to 20% open area and an AOS between about 0.074 mm and 0.841 mm,
   wherein said first nonwoven fabric and first woven fabric when connected have an apparent opening size (AOS) less than about 0.106 mm and a combined permeability greater than 0.1 cm/sec; and
   (b) a drainage medium for in-plane flow of the fluid directly against the other of the opposite faces of the first woven fabric, wherein the drainage medium is connected to the first woven fabric so as to thereby maintain the drainage medium against the other of the opposite faces of the first woven fabric.

2. The geotechnical layer of claim 1 wherein said geotechnical layer is a geocomposite and said drainage medium is a geonet.

3. The geotechnical layer of claim 1, wherein said first woven fabric comprises woven high-modulus polymeric filaments.

4. The geotechnical layer of claim 3, wherein said filaments are monofilaments.

5. The geotechnical layer of claim 3, wherein said filaments are multifilament.

6. The geotechnical layer of claim 1, wherein said first nonwoven fabric has a cross-plane water flow rate of greater than 3,000 liter/min/m$^2$.

7. The geotechnical layer of claim 1, wherein said first woven fabric has a cross-plane water flow rate between about 500 and 8,000 liter/min/m$^2$.

8. A landfill comprising a substantially horizontal geotechnical layer between layers of fill to facilitate draining of fluid from at least one layer of fill, said geotechnical layer comprising:
   (a) a geotextile for cross-plane filtering of fine particles from a fluid comprising:
   a primary layer consisting of a first nonwoven fabric with opposite faces and adapted to initially filter fluid having fine particles, wherein said first nonwoven fabric has an apparent opening size (AOS) at least about 0.180 mm and a thickness greater than about 1.0 mm at 2 kPa normal load, and
   a secondary layer consisting of a first woven fabric with opposite faces and adapted to secondarily filter particles not filtered from the fluid by the first nonwoven fabric of the primary layer, wherein one of the opposite faces of said first nonwoven fabric is directly against one of the opposite faces of said first woven fabric, said first nonwoven fabric connected to said first woven fabric by needle punching whereby fibers of said first nonwoven fabric are punched into said first woven fabric to extend through said one opposite face of said first woven fabric, wherein said first woven fabric has about 2% to 20% open area and an AOS between about 0.074 mm and 0.841 mm, wherein said first nonwoven fabric and first woven fabric when connected have an apparent opening size (AOS) less than about 0.106 mm and a combined permeability greater than 0.1 cm/sec; and (b) a drainage medium for in-Diane flow of the fluid directly against the other of the opposite faces of the first woven fabric, wherein the drainage medium is connected to the first woven fabric so as to thereby maintain the drainage medium against the other of the opposite faces of the first woven fabric.

9. The landfill of claim 8, wherein said geotextile is on one side of said drainage media and further comprising a second nonwoven fabric on the other side of said drainage media.

10. The landfill of claim 9, wherein said geotextile is above said drainage media.

11. The landfill of claim 8, wherein said at least one layer of fill is directly against said first nonwoven fabric.

12. A geotechnical project site, comprising a plurality of alternating layers of:

fill; and substantially horizontal geotechnical layers, each of said geotechnical layers including (a) a geotextile for cross-plane filtering of fine particles from a fluid comprising:

a primary layer consisting of a first nonwoven fabric with opposite faces and adapted to initially filter fluid having fine particles, wherein said first nonwoven fabric has an apparent opening size (AOS) at least about 0.180 mm and a thickness greater than about 1.0 mm at 2 kPa normal load, and a secondary layer consisting of a first woven fabric with opposite faces and adapted to secondarily filter particles not filtered from the fluid by the first nonwoven fabric of the primary layer, wherein one of the opposite faces of said first nonwoven fabric is directly against one of the opposite faces of said first woven fabric, said first nonwoven fabric connected to said first woven fabric by needle punching whereby fibers of said first nonwoven fabric are punched into said first woven fabric to extend through said one opposite face of said first woven fabric, wherein said first woven fabric has about 2% to 20% open area and an AOS between about 0.074 mm and 0.841 mm, wherein said first nonwoven fabric and first woven fabric when connected have an apparent opening size (AOS) less than about 0.106 mm and a combined permeability greater than 0.1 cm/sec; and (b) a drainage medium for in-plane flow of the fluid directly against the other of the opposite faces of the first woven fabric, wherein the drainage medium is connected to the first woven fabric so as to thereby maintain the drainage medium against the other of the opposite faces of the first woven fabric.

13. The geotechnical project site of claim 12, wherein said geotextile is on one side of said drainage media and further comprising a second nonwoven fabric on the other side of said drainage media.

14. The geotechnical project site of claim 13, wherein in each geotechnical layer said geotextile is above said drainage media and said second nonwoven fabric is beneath said drainage media.

* * * * *

UNITED STATES PATENT AND TRADEMARK OFFICE
CERTIFICATE OF CORRECTION

PATENT NO. : 9,889,396 B2
APPLICATION NO. : 15/407051
DATED : February 13, 2018
INVENTOR(S) : Mengjia Li et al.

Page 1 of 1

It is certified that error appears in the above-identified patent and that said Letters Patent is hereby corrected as shown below:

In the Claims

Claim 8, (Column 9, Line 17), delete "in-Diane" and substitute therefor "in-plane".

Signed and Sealed this
Second Day of April, 2019

Andrei Iancu
*Director of the United States Patent and Trademark Office*